(12) United States Patent
Witheiler

(10) Patent No.: US 8,756,631 B2
(45) Date of Patent: *Jun. 17, 2014

(54) METHOD AND APPARATUS FOR DISPLAY OF A DIGITAL VIDEO SIGNAL HAVING MINOR CHANNELS

(75) Inventor: Matthew Witheiler, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 194 days.

This patent is subject to a terminal disclaimer.

(21) Appl. No.: 13/173,601

(22) Filed: Jun. 30, 2011

(65) Prior Publication Data

US 2011/0255002 A1 Oct. 20, 2011

Related U.S. Application Data

(63) Continuation of application No. 10/844,929, filed on May 13, 2004, now Pat. No. 7,996,863.

(51) Int. Cl.
*H04N 5/445* (2011.01)
*G06F 12/02* (2006.01)
*H04N 11/02* (2006.01)

(52) U.S. Cl.
USPC ............... 725/38; 345/565; 375/240.25

(58) Field of Classification Search
USPC ............... 725/37–59; 345/565; 375/240.25
See application file for complete search history.

(56) References Cited

U.S. PATENT DOCUMENTS

| | | | |
|---|---|---|---|
| 5,329,369 A | 7/1994 | Willis | |
| 5,485,221 A | 1/1996 | Banker et al. | |
| 5,504,535 A | 4/1996 | Abe | |
| 6,115,074 A | 9/2000 | Ozkan | |
| 6,763,522 B1 * | 7/2004 | Kondo et al. | 725/39 |
| 6,766,526 B1 | 7/2004 | Ellis | |
| 7,236,531 B1 * | 6/2007 | Gotoh et al. | 375/240.28 |
| 2002/0039385 A1 * | 4/2002 | Okada | 375/240.2 |
| 2002/0060750 A1 | 5/2002 | Istvan et al. | |
| 2002/0167609 A1 * | 11/2002 | Seo | 348/554 |
| 2003/0091115 A1 * | 5/2003 | Yamana et al. | 375/240.25 |
| 2004/0268393 A1 * | 12/2004 | Hunleth et al. | 725/44 |
| 2005/0062889 A1 * | 3/2005 | Linzer | 348/554 |
| 2005/0232167 A1 | 10/2005 | Gilbert et al. | |
| 2005/0273838 A1 | 12/2005 | Witheiler | |

* cited by examiner

*Primary Examiner* — Hoang-Vu A Nguyen-Ba
(74) *Attorney, Agent, or Firm* — Faegre Baker Daniels LLP

(57) ABSTRACT

A method and apparatus for display of a digital video signal includes a demodulator capable of receiving a major channel of the digital video signal. The major channel of the digital video signal includes one or more minor channels, wherein the minor channels are specific and separate channels of broadcast information. The method and apparatus for display of a digital video signal further includes decoders coupled to the demodulator, wherein the decoders receive the minor channels disposed within the major channel. The decoders thereupon generate minor channel video signals, wherein the minor channel video signal includes the video information for each associated channel. The method and apparatus further includes receiving the incoming video signals and format the video signals for simultaneous display of active video from multiple channels. A display configurator provides the minor channel video signals to an output display, to actively display the minor channels.

18 Claims, 3 Drawing Sheets

METHOD AND APPARATUS FOR DISPLAY OF A DIGITAL VIDEO SIGNAL HAVING MINOR CHANNELS

RELATED CO-PENDING APPLICATION

This application is a continuation of U.S. Application Ser. No. 10/844,929, filed May 13, 2004, entitled "METHOD AND APPARATUS FOR DISPLAY OF A DIGITAL VIDEO SIGNAL", having as inventor Matthew Witheiler, owned by instant assignee and is incorporated herein by reference.

FIELD OF THE INVENTION

The present invention relates generally to the processing of broadcast information and more specifically to the display of a digital video broadcast signal.

BACKGROUND OF THE INVENTION

In existing broadcast television systems, broadcast signals are broadcasted in both digital and analog format. The digital format contains similarities to existing and well-known analog broadcast formats, but further includes added information and channel bandwidth, among other benefits. For example, an analog signal transmits a single channel dedicated to a specific frequency range. Therefore, for a dedicated frequency range, a tuner tunes a single channel.

In the digital domain of video broadcasting, the digital format allows the embedding of multiple channels for a single frequency dedicated channel. Typically, the frequency dedicated channel is referred to as a major channel and the embedded multiple channels are referred to as minor channels. For example, in the analog system, channel 41 would contain a single television station broadcast, such as a local television station affiliated with a national broadcaster. Although, a digital television broadcast may have multiple channels associated with the dedicated channel 41. For exemplary purposes only, digital broadcast channel 41 may include a first channel, which is a high definition format of the local television station, a second channel that includes weather information and a third channel that is associated with the affiliated national broadcaster.

In the current digital broadcast technology, users are required to use a multi-part channel numbering system. A first set of numbers is directed to the major channel, such as channel 41. A second set of numbers is then directed to the minor channels, such as channels 41-01, 41-02 or 41-03. Therefore, users are required to learn a whole new channel numbering system and are also required to further input a total of five inputs, including the "—" to select a channel.

Another approach is to default a user to the major channel upon entering the first set of numbers. Using the above example, if the user enters channel 41, the tuner is defaulted to displaying channel 41-01. The user may then toggle using up and down buttons to move between channels 41-01 and 41-03.

In the analog broadcast system, channel switching techniques exist wherein a user is allowed to preview multiple channels at a single time. In one embodiment, multiple tuners allow for a picture in picture viewing mode, wherein multiple screens display different outputs, in accordance with well-known picture in picture techniques. Although, picture in picture is inherently limited based on needing a separate tuner for each of the different pictures. Therefore, in a system having the ability to provide picture in picture display, a second tuner is required. For a system in the analog format to have more than a picture in picture viewing scenario, multiple tuners would be required. Adding tuners not only requires further processing overhead and power requirements, but also adds to the overall space of a processing device as well as significant costs increases for the multiple tuners.

Another analog approach for multiple channels is to provide still-picture thumbnails of multiple channels. This approach requires the use of thumbnails for multiple channels due again to the limitations of needing separate tuners for multiple signals. In this approach, the tuner may be adjusted to a particular channel for a period of time to acquire of a thumbnail of the display, typically a single frame of image data. The tuner may then be advanced to the next channel to acquire another frame of image data. This process is continued in a rolling fashion, updating thumbnails and allowing for a single screen visual view of multiple channels. Although, this approach is limited to only still pictures of existing channels and requires extensive processing to cycle the tuner through different channels and update the thumbnails on a continuous basis.

Therefore, there exists a need for the navigation of multiple minor channels of a digital video broadcast signal.

DETAILED DESCRIPTION OF THE PREFERRED EMBODIMENTS

Briefly, the present invention includes a method and apparatus for display of a digital video signal, including a demodulator capable of receiving a major channel of the digital video signal. As discussed above, the major channel is a frequency-based designated channel coordinated within a digital video transmission signal. The major channel of the digital video signal includes one or more minor channels, wherein the minor channels are specific and separate viewing channels. For example, as discussed above, a major channel may be channel 41 and the minor channels may be channel 41-01, such as a local television station, a second channel including weather information and a third channel associated with a national broadcast channel.

The method and apparatus for display of a digital video signal further includes decoders coupled to the demodulator, wherein the decoders receive the minor channels disposed within the major channel. The decoders thereupon generate minor channel video signals, wherein the minor channel video signal includes the video information for each associated channel.

The method and apparatus further includes a display configurator coupled to the decoders, wherein the display configurator may be implemented in hardware, software or a combination thereof to receive the incoming video signals and format the video signals for simultaneous display of active video from multiple channels. Thereupon, the display configurator is capable of providing one or more of the minor channel video signals to an output display, wherein the display can then actively display multiple screens of active video, wherein the multiple screens and active video are all minor channels from the same major channel of the digital video signal.

Figure 1:
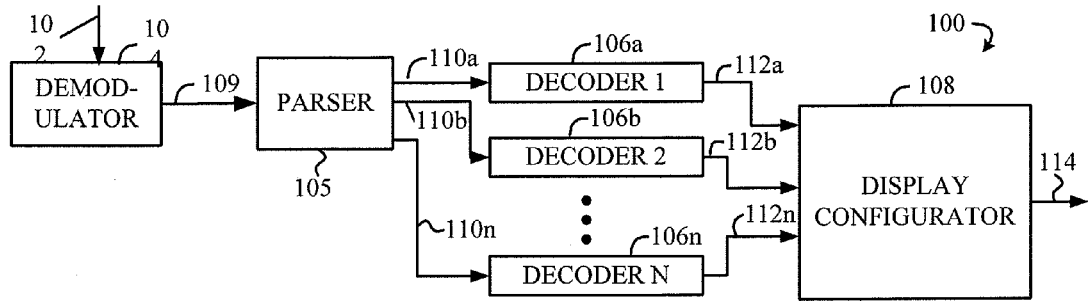
FIG. 1 illustrates a schematic block diagram of an apparatus for display of a digital video signal in accordance with one embodiment of the present invention.

More specifically, FIG. 1 illustrates one embodiment of an apparatus 100 for providing the display of a digital video signal 102. The apparatus 100 includes a demodulator 104, a parser 105, a plurality of decoders 106a-106n and a display configurator 108. The decoders may include an audio decoder operative to decode a plurality of minor channel audio signals. The demodulator 104 may be any standard signal demodulator capable of demodulating the incoming digital video signal 102 to extract a selected major channel having one or more minor channels associated therein. The demodulator 109 provides a demodulated signal 109 to the parser 105.

The decoders 106a-106n receive minor channel signals 110a-110n, wherein the number of minor channel signals 110 provided from the parser 105 to the decoders 106 is determined based on, in one embodiment, the number of minor channels contained within a major channel of the video signal 102. As mentioned above, the minor channels may include a plurality of minor channel audio signals, such that an audio signal for one of the minor channels will be displayed when one of the minor channels is being displayed.

The decoders 106a-106n thereon decode the minor channel signals 110 in accordance with standard decoding techniques, where the minor channel signals include audio signals. For example, in one embodiment the minor channel signals 110 may be encoded with an MPEG formatting, therefore the decoders 106 would use standard MPEG decoding techniques to generate minor channel video signals 112a-112n. The decoders 106 provide the minor channel video signals 112 to the display configurator 108. As previously mentioned, an audio decoder may decode a plurality of minor channel audio signals.

The display configurator 108 may be implemented in hardware, software or a combination thereof. The display configurator receives the minor channel video signals 112a-112n from the decoders 106a-106n and coordinates the minor channel video signals into an output display signal 114. The display configurator 108 configures the sizing and positioning of the minor channel video signals 112 in accordance with either default settings or user defined parameters, as discussed in further detail below.

Figure 2:
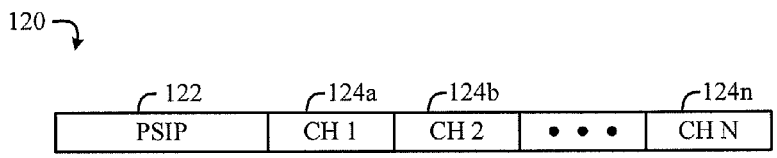
FIG. 2 illustrates a graphical representation of a digital video broadcast transmission signal.

FIG. 2 illustrates a graphical representation of a major channel 120 of a digital video signal. The major channel includes a program and system information protocol field 122 which contains information relating to each of the specific minor channels and overall programming information, such as but not limited to electronic program guide information, close captioning data, parental control information, or any other suitable information which may be further included in the digital video signal or was previously found within analog-based vertical blanking intervals. As recognized by one having ordinary skill in the art, any further information may be provided within the program and system information protocol data field 122.

FIG. 2 further illustrates the multiple channels 124a-124n. In the digital video signal 120 each channel is defined by a packet of information representing a portion of the corresponding channel information. Using the above-noted example of the major channel being channel 41 and having three minor channels, channel n would be channel 3 in the illustrative embodiment of FIG. 2. Channel one 124a would include data relating to the first channel, representing a local television station, the channel 2 data packet 124b would include video information relating to the weather information, such as the weather channel and the third channel 124n may contain information associated with an affiliated national broadcasting station. Therefore, the demodulator 104 of FIG. 1 would receive the incoming signal 102 which would contain multiple major channels 120 such that the demodulator 104 pulls off a specific major channel 120, such as an example of channel 41. The demodulator 104 FIG. 1 further then can separate and parse out the specific channels 124a-124n, which are then provided as a video signal 110a-110n to the decoders 106a-106n of FIG. 1.

Figure 3:
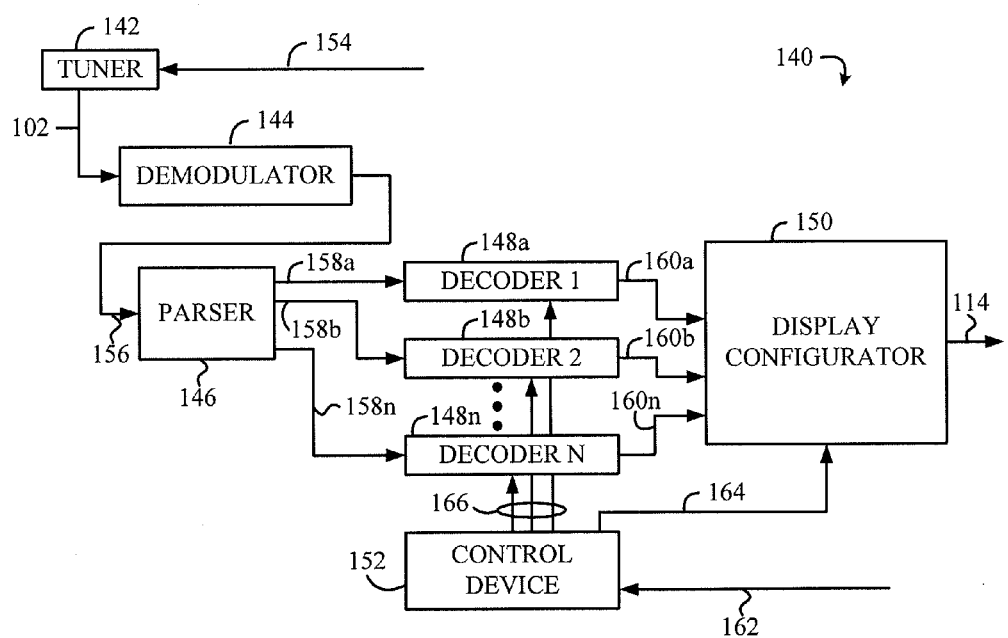
FIG. 3 illustrates a schematic block diagram of an apparatus for display of a digital video signal in accordance with another embodiment of the present invention.

FIG. 3 illustrates an apparatus 140 for the display of a digital video signal in accordance with another embodiment of the present invention. The apparatus 140 includes a tuner 142 coupled a demodulator 144. The demodulator is coupled to a parser 146, wherein the parser 146 is coupled to a plurality of decoders 148a-148n. The plurality of decoders 148a-148n is coupled to a display configurator 150, wherein a control device 152 is coupled to the decoders 148a-148n and the display configurator 150.

The tuner 142 receives a transport stream signal 154. The tuner 142 may be any suitable tuner capable of receiving a digital input signal and thereupon generating a digital video signal 102, which is a major channel signal, wherein the major channel includes minor channels therein. The transport stream 154 may be provided from any suitable source, such as a satellite transmission, a cable feed, a digital video recording device or any other suitable input source as recognized by one having ordinary skill in the art. Moreover, the transport stream 154 may be provided to the tuner using any suitable transmission path such as, but not limited to a bus.

The demodulator 144 receives the video signal 102 and thereupon performs demodulation to generate a single demodulated output signal 156, which is to the parser 146. The parser 146 may be any suitable device implemented in hardware, software or a combination thereof for receiving a combined input signal, such as the signal 120 of FIG. 2 thereupon parsing out the output into multiple individual signals.

The parser 146 provides a plurality of minor channel video signals 158a-158n to the decoders 148a-148n, respectively. As noted above, based on the number of minor channels 124 of FIG. 2 within a major channel 120 of FIG. 2, the same number of minor channel video signals 158 will be provided to corresponding number of decoders 148. The decoders 148a-148n decode the digital signal in accordance with standard digital decoding techniques to generate minor channel video signals 160a-160n, which are provided to the display configurator 150. Likewise an audio decoder operative to decode a plurality of minor channel audio signals and an audio output selection device may provide a single audio output corresponding to one of the plurality of minor channel video signals in some embodiments.

The display configurator 150 operates similar to the display configurator 108 of FIG. 1 to receive the multiple minor channel video signals 160a-160n and provide the output signal 114, typically to a display device. This embodiment of the present invention further includes a control device 152 capable of receiving a user input signal 162. The user input signal 162 may represent signals indicating formatting approach to set up the display of the multiple active minor channels, may relate to adjusting the display of multiple active video channels, may relate to selecting one of the active video channels, or may be any other channel user input as recognized by one having ordinary skill in the art associated with establishing, modifying, maintaining or adjusting the display or selection of multiple active minor channel video displays on a single display device. likewise an audio output selection device may provide a single audio output corresponding to one of the plurality of minor channel video signals.

The control device may be a processing unit, such as but not limited to a single processor, a plurality of processors, a DSP, a microprocessor, an ASIC, a state machine or any other implementation capable of processing and executing executable commands. The term processor should not be construed to refer exclusively to hardware capable of executing software, and may implicitly include DSP hardware, ROM for storing software, and any other volatile or non-volatile storage medium.

The control device 152 receives the user input signal 162 and thereupon generates a display control signal 164. The display control signal 164 may be any suitable command signal provided that the display configurator 150 for the adjustment of the output display signal 114 from the display configurator 150. In one embodiment, the control device may further provide decode commands 166 to the corresponding decoders 148a-148n. The decode commands 166 may correspond to enabling or disabling specific decoders 148 based on the display configurator 150.

In an exemplary embodiment of the major channel 120 having five minor channels 124 of FIG. 2, and the display configurator 150 determines to only make four of the channels actively viewable on a display (not shown), the control device 152 may use a decode command 166 to disable the decoder 148 of the channel which is not going to be displayed. Thereby, in one embodiment, system resources may be preserved based on a feedback of which minor channel video signals 160 are to be generated for the output display signal 114.

The above description relates to the present invention providing for receiving a standard incoming digital video signal, such as the transport stream 154 of FIG. 3, and thereupon generating the display signal 114, wherein the display signal 114 includes multiple active minor channel video displays. Although, the present invention further provides for the actual simultaneous display of active minor channels, as discussed below.

Figure 4:
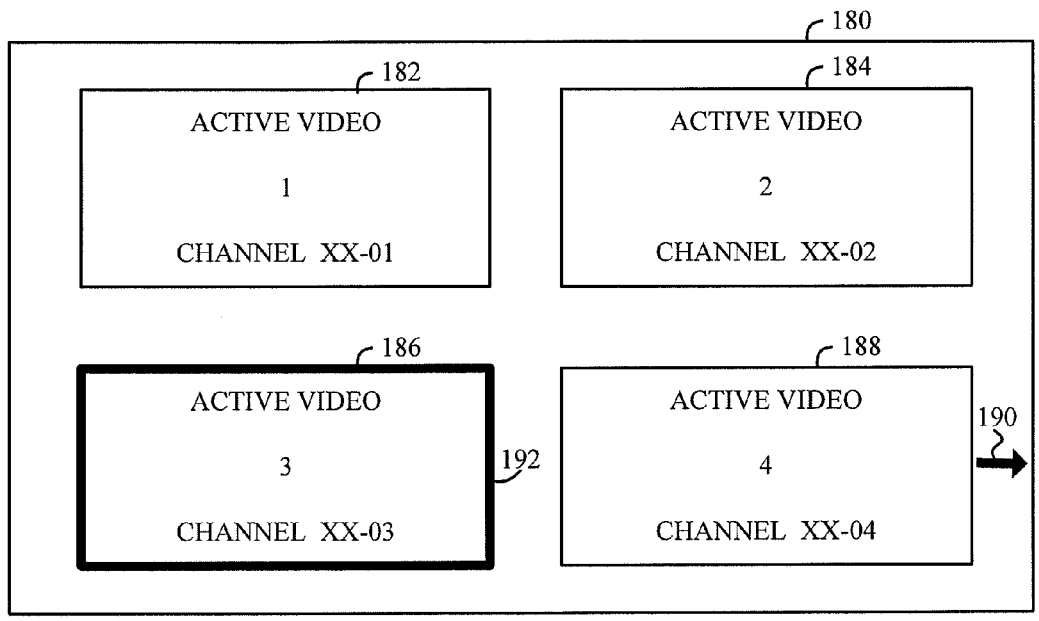
FIGS. 4 and 5 illustrate graphical representations of different types of displays of a digital video signal in accordance with different embodiments of the present invention.

FIG. 4 illustrates a representative example of a display 180, which may be a monitor, television screen, a projection screen, a liquid crystal display or any other suitable display devices recognized by one having ordinary skill in the art capable of displaying live video. The display 180 is partitioned into four separate windows 182, 184, 186 and 188. In the illustrated embodiment of FIG. 4, the display 180 receives minor channel information for a major channel having at least four minor channels. As illustrated in each of the active video windows 182-188, a channel is designated as channel xx-01 through channel xx-04.

The display 180 further includes an arrow icon 190 representing a forward scrolling feature if the major channel includes more minor channels. For example, if there is a minor channel xx-05, a user may select the arrow 190 to rotate or scroll the active video windows, removing one of the active video windows, such as active video window 182 and inserting the active video window relating to the minor channel xx-05. In the preferred embodiment, a user may utilize any suitable input device, such as, but not limited to, a remote control, a mouse, keyboard, voice commands, to rotate a curser or actively jump from element to element in the display 180 and upon entering a specific input to thereupon generate the user input signal 162 of FIG. 3 to provide user feedback. An audio signal may likewise be selected based on a selection of one of the active viewing windows and the selection of one of the active viewing windows when it is selected using at least one of a cursor and a plurality of arrow selection inputs.

Further illustrated in FIG. 4, in one embodiment shading 192 may be utilized to indicate the selection of a particular active video window, such as the shading 192 for active video window 186. In this embodiment, a user upon selecting a particular major channel would automatically be given the display 180 actively displaying two or more of the minor channels. The minor channels may include a plurality of minor channel audio signals corresponding to the plurality of minor channel video signals. The user would then be able to scroll using the input and select one of the active videos displays 182-188 to select a minor channel for viewing. In the embodiment illustrated in FIG. 4, the user could depress an enter or select button which would thereupon provide the display configurator 150 of FIG. 3 to reconfigure the display signal 114 to include just the video output of selected channel within the whole screen 180 and the control device 152 could disable all of the other decoders 148 with the decode signals 166 of FIG. 3.

As such, the present invention allows a user to navigate amongst minor channels of a major channel through the visual display of active video from a portion of the minor channels. As noted previously, prior solutions required the user to enter a four digit channel entry or would require a user to navigate up and down amongst specific minor channels, wherein illustrated in FIG. 4, the user can provide a multiple window based display of the active video from the minor channels of the major channel of the digital video signal.

Figure 5:
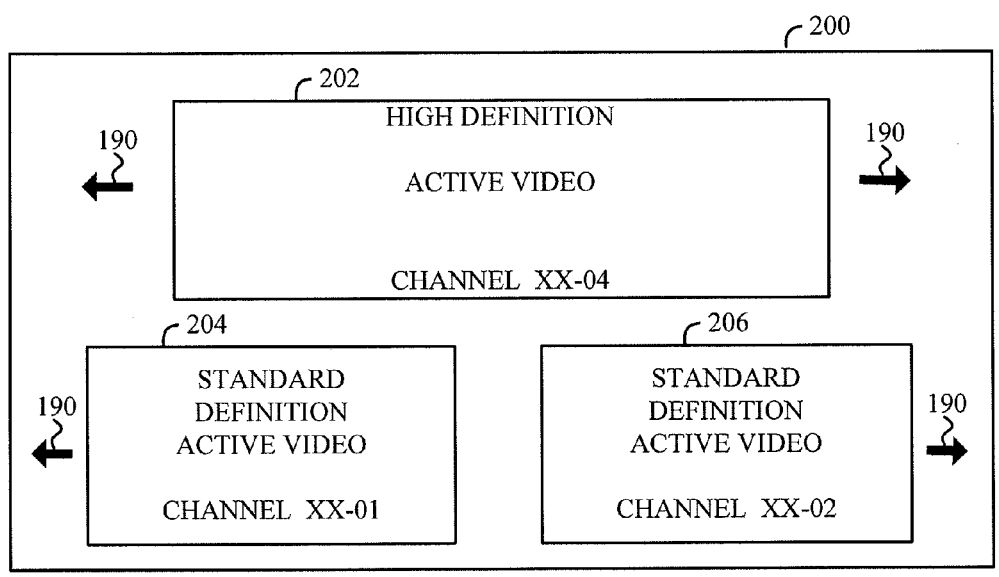

With a digital video signal, the definition of the minor channels may also be a factor in channel selection or overall video display. For example, the major channel of the digital video signal may include one or more high definition (HD) minor channels and one or more standard definition (SD) minor channels. FIG. 5 illustrates a display 200 having an HD active video window 202 and two SD active video windows 204 and 206. The display 200 further includes the navigational arrows 190 representative of further non-visible minor channels.

As recognized by one having ordinary skill in the art, the high definition active video within window 202 is in a preferred 16×9 formatting and the standard definition active video windows 204 and 206 are in the standard 4×3 formatting. As noted by one having ordinary skill in the art, the above-noted formatting of the 16×9 and 4×3 formatting are exemplary formatting only and are not met to be so limiting herein.

In the embodiment illustrated in FIG. 5, the HD active video window 202 will illustrate for example minor channel 4, which is in HD format, and channels 1 and 2 in windows 204 and 206 in SD format. Wherein the major channel may include multiple HD minor channels and SD minor channels, the arrows 190 allow for one embodiment of the navigation between multiple windows. For example, if the major channel included two HD minor channels, and minor channel 4 is displayed in the HD active video window 202, a user may select the arrow 190 which would scroll the display to then allow the other high definition minor channel within the window 202. Similarly, the same approach maybe utilized to scroll left to right with arrows 190 for both the HD and SD windows. The minor channels may include a plurality of minor channel audio signals corresponding to the plurality of minor channel video signals where the audio signal for the active video for a minor channel may be displayed based on selection of the active viewing window.

As recognized by one having ordinary skill in the art, any formatting display may be established through the control device 152 such at the display configurator 150 provides the corresponding display output signal 114. For example, if a major channel includes only high definition minor channels, a single high definition active video window, such as window 202 of FIG. 5 maybe displayed on the top portion of the screen and a second high definition active video may be displayed on a bottom portion of the screen.

It is further noted that in accordance with another embodiment of the present invention, resizing or magnification techniques maybe utilized to allow for the display of more active video windows. For example, an active video window may be a reduced size such that a magnification element when in proximity to the window may cause the window itself to enlarge in size obscuring other windows but still making the windows at least partially visible in a background format. Furthermore, the dimensions of the video windows, such as 202, 204 and 206 of FIG. 5 maybe scaled based on formatting, similar to the current approach utilized to scale a SD video signal in a HD screen, using bars on the perimeters of a window to allow for 4×3 visual formatting in 16×9 formatting space.

Figure 6:
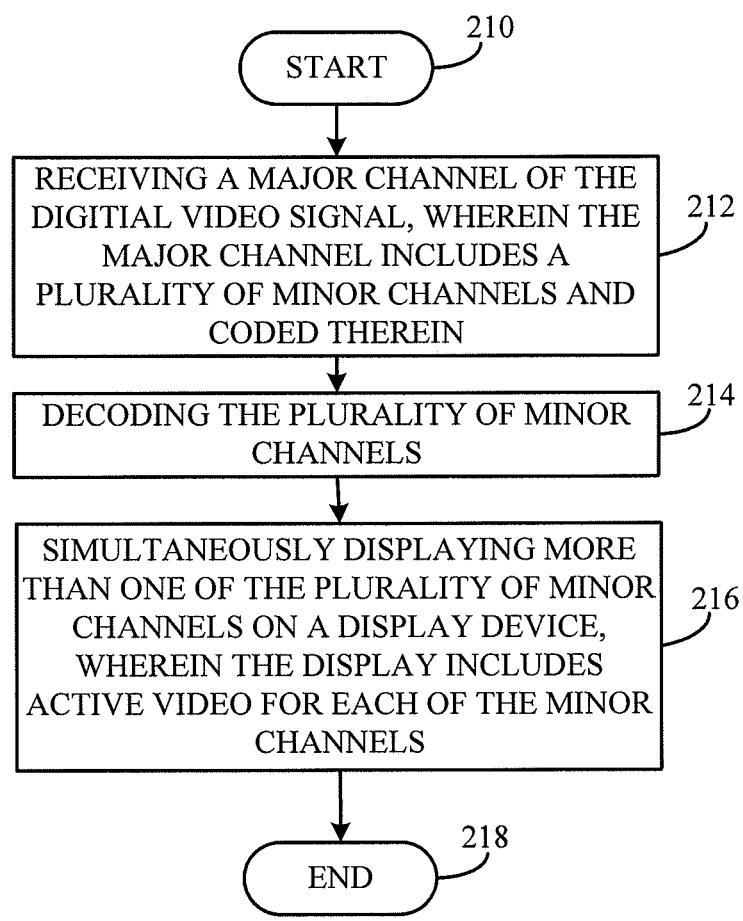
FIG. 6 illustrates a flowchart of a method for display for a digital video signal in accordance with one embodiment of the present invention.

FIG. 6 illustrates a flowchart of one embodiment of a method for displaying the digital video signal of the present invention. The method begins, step 210 by receiving a major channel of the digital video signal, one of the major channels includes a plurality of minor channels. As discussed above, the major channel 120 maybe included within a transport stream 154, which is then separated from the transport stream 154 using the tuner 142. Step 212 is decoding the plurality of minor channels. In one embodiment, the decoders 106a-106n may decode the minor channels using a standard digital decoding technique.

Step 216 is simultaneously displaying more than one of the plurality of minor channels on a display device, including active video for each of the minor channels. As illustrated in FIGS. 4 and 5, multiple active video windows 182-188 and 202-206 respectively allow for the simultaneous display of multiple minor channels. Thereupon, one embodiment of the present invention, the method is complete, step 220.

As such, the present invention provides for the display of a digital video signal with a major channel having a plurality of minor channels. The present invention allows for the display of multiple active windows of video data wherein the active windows represent at least a portion of the minor channels associated with a major channel. The present invention further allows for either standardized active video display or coordinating the display based on the definition formatting, such as high definition or standard definition, of the minor channel. Therefore, the present invention improves navigation and channel selection techniques by allowing the user to maintain a signal level of channel changing to select a major channel and then a visual navigation through minor channels of the major channel within the digital video signal.

It should be understood that the implementation of other variations and modifications of the invention in its various aspects will be apparent to those of ordinary skill in the art, and that the invention is not limited by the specific embodiments described herein. For example, the display configurator 108 may automatically display a minor channel for a major channel having a signal minor channel and may utilize the present invention for a major channel having more than one minor channels, or may be further set to ignore minor channels of a major channel to which a user may either not subscribe to or does not wish to navigate through. It is therefore contemplated to cover by the present invention, any and all modifications, variations or equivalents that fallen within the spirit and scope of the basic underlying principles disclosed and claimed herein.

What is claimed is:

1. A method for display of a digital video signal, the method comprising:
   receiving a major channel of the digital video signal, wherein the major channel includes a plurality of minor channels encoded therein, wherein said plurality of minor channels includes at least one high definition minor channel;
   decoding the plurality of minor channels;
   simultaneously displaying more than one of the plurality of minor channels on a display device, wherein the display includes active motion video for each of the plurality of minor channels including said at least one high definition minor channel;
   providing a navigation feature for navigating between said plurality of minor channels;
   defining a plurality of active viewing windows;
   providing minor channels video signals to at least one of the plurality of active viewing windows;
   displaying an audio signal for one of the minor channels being displayed, wherein the audio signal is selected based on a selection of one of the active viewing windows;
   generating a first viewing window having a sixteen by nine aspect ratio for a high definition minor channel;
   generating a second viewing window having a four by three aspect ratio for a low definition minor channel;
   tracking the location of a magnification indicator; and
   magnifying one of the active viewing windows when the magnification indicator is in approximation with the location of said one of the active viewing windows on the display, wherein any remaining active viewing windows are at least partially visible in a background of the magnified active viewing window.

2. An apparatus for display of a digital video signal, the apparatus comprising:
   a demodulator operative to receive a major channel of the digital video signal, wherein the major channel includes a plurality of minor channels including at least one high definition minor channel;
   at least one decoder operative to receive the plurality of minor channels and operative to generate a plurality of minor channel video signals; and
   a display configurator operatively coupled to the at least one decoder, the display configurator operative to receive the plurality of minor channel video signals and operative to configure the simultaneous display of active motion video for more than one of the plurality of minor channel video signals including said at least one high definition minor channel, the display configurator further operative to display a navigation feature for navigating said active video for each of the minor channels included with the major channel, and further operative to navigate said active video for each of the minor channels wherein said navigating removes at least one active video of one minor channel and inserts another active video, for a different minor channel, in response to a user input for navigating, wherein the display configuration signal includes magnifying a selected display window, wherein any other display windows are at least partially visible in a background of the magnified selected display window.

3. The apparatus of claim 2 further comprising:
a tuner operative to receive the digital video signal and operative to tune the major channel, wherein the tuner is operatively coupled to the demodulator.

4. The apparatus of claim 2 wherein the demodulator generates a transport stream including the minor channel video signals.

5. The apparatus of claim 4 wherein the transport stream includes a program stream protocol.

6. The apparatus of claim 4 further comprising:
a parser operatively coupled to the demodulator such that the parser parses the minor channel video signals from the transport stream and provides each of the minor channel video signals to the at least one decoder.

7. The apparatus of claim 4 wherein the transport stream is provided from the demodulator to the parser across a bus.

8. The apparatus of claim 2 further comprising:
a processing unit operative to receive a user input signal, wherein the user input signal provides selection information regarding the simultaneously display of active video for more than one of the plurality of minor channel video signals; and
the processing unit operative to generate a display control signal, wherein the display control signal is provided to the display configurator, the display control signal provides for the configuration of the simultaneously display of active video for more than one of the plurality of minor channel video signals.

9. The apparatus of claim 2, wherein said display configurator is further operative to display at least four minor channels of said plurality of minor channels, and operative to navigate said at least four minor channels by removing one of said at least four minor channels and inserting another minor channel of said plurality of minor channels in response to said user input for navigating said minor channels.

10. The apparatus of claim 2, wherein said display configurator is further operative to:
display said at least one high definition minor channel in a first aspect ratio; and
display at least two standard definition minor channels in a second aspect ratio that is smaller than said first aspect ratio.

11. The apparatus of claim 10, wherein said display configurator is further operative to:
display a first navigation feature for navigating said at least one high definition minor channel to at least a second high definition channel in said first aspect ratio; and
display a second navigation feature for navigating said at least two standard definition minor channels to display at least a third standard definition minor channel in said second aspect ratio.

12. The apparatus of claim 2, wherein said display configurator is further operative to:
display said at least one high definition minor channel in a high definition aspect ratio; and
display a second high definition minor channel in said high definition aspect ratio.

13. The apparatus of claim 2, wherein said display configurator is further operative to:
display said at least one high definition minor channel in a first aspect ratio; and
display at least a second high definition minor channel in a second aspect ratio that is smaller than said first aspect ratio.

14. The apparatus of claim 2, wherein said display configurator is further operative to:
displaying a plurality of active viewing windows, each of said active viewing windows displaying said active video for one minor channel of said plurality of minor channels; and
wherein said navigating further comprises:
resizing, in response to a user selection input, a selected active viewing window of reduced size, wherein said resizing causes the selected active viewing window to enlarge in size, obscuring other non-selected active viewing windows, wherein said other non-selected active viewing windows are at least partially visible in a background format, wherein each non-selected active viewing window is of said reduced size.

15. An apparatus for display of a digital video signal, the apparatus comprising:
a demodulator operative to receive a major channel of the digital video signal, wherein the major channel includes a plurality of minor channels including at least one high definition minor channel;
at least one decoder operative to receive the plurality of minor channels and operative to generate a plurality of minor channel video signals; and
a display configurator operatively coupled to the at least one decoder, the display configurator operative to receive the plurality of minor channel video signals and operative to configure the simultaneous display of active motion video for more than one of the plurality of minor channel video signals including said at least one high definition minor channel, the display configurator further operative to display a navigation feature for navigating said active video for each of the minor channels included with the major channel, and further operative to navigate said active video for each of the minor channels wherein said navigating removes at least one active video of one minor channel and inserts another active video, for a different minor channel, in response to a user input for navigating;
a processing unit operative to:
receive a user input signal, wherein the user input signal provides selection information regarding the simultaneously display of active video for more than one of the plurality of minor channel video signals; and
generate a display control signal, wherein the display control signal is provided to the display configurator, the display control signal provides for the configuration of the simultaneously display of active video for more than one of the plurality of minor channel video signals, wherein the display configuration signal includes at least one of the following: magnifying a selected display window wherein any other display windows are at least partially visible in a background of the magnified selected display window, adding another display window, and removing one of the display windows.

16. A method for display of a digital video signal, the method comprising:
receiving a major channel of the digital video signal, wherein the major channel includes a plurality of minor channels encoded therein, wherein said plurality of minor channels includes at least one high definition minor channel;
decoding the plurality of minor channels;
defining a plurality of active viewing windows, wherein the plurality of active viewing windows are based on a definition format of the minor channel;
providing minor channels video signals to at least one of the plurality of active viewing windows;

simultaneously displaying more than one of the plurality of minor channels on a display device, wherein the display includes active motion video for each of the plurality of minor channels including said at least one high definition minor channel;

displaying an audio signal for one of the minor channels being displayed, wherein the audio signal is selected based on a selection of one of the active viewing windows and the selection of one of the active viewing windows is performed using at least one of: a cursor and a plurality of feature selection inputs;

displaying a navigation feature for navigating said plurality of active viewing windows on the display device, wherein a user navigation input removes at least one of said active viewing windows from said display and inserts at least another active viewing window, for a different minor channel;

tracking the location of a magnification indicator; and magnifying one active viewing window of said plurality of active viewing windows when the magnification indicator is in approximation with the location of said one active viewing window on the display, wherein any remaining active viewing windows are at least partially visible in a background of the magnified active viewing window.

17. The method of claim 16 further comprising:

generating a first viewing window having a sixteen by nine aspect ratio for a high definition minor channel; and generating a second viewing window having a four by three aspect ratio for a low definition minor channel.

18. A method for display of a digital video signal, the method comprising:

receiving a major channel of the digital video signal, wherein the major channel includes a plurality of minor channels encoded therein, wherein said plurality of minor channels includes at least one high definition minor channel;

decoding the plurality of minor channels;

simultaneously displaying more than one of the plurality of minor channels on a display device, wherein the display includes active video for each of the minor channels including said at least one high definition minor channel;

providing a navigation feature for navigating between said plurality of minor channels comprising displaying a navigation feature for navigating a plurality of active viewing windows, each of said active viewing windows displaying one minor channel of said plurality of minor channels, wherein navigating removes one of said active viewing windows and inserts another active viewing window, for a different minor channel, in response to a user input for navigating;

displaying a first navigation feature for navigating between said at least one high definition minor channel and at least a second high definition channel in said first aspect ratio; and displaying a second navigation feature for navigating between said at least two standard definition minor channels and at least a third standard definition minor channel to display said at least a third standard definition minor channel in said second aspect ratio.

\* \* \* \* \*